United States Patent Office 3,117,966
Patented Jan. 14, 1964

3,117,966
PROCESS FOR THE PREPARATION OF
6-METHYL-3-OXO-Δ$^{4,6}$-STEROIDS
Vladimir Petrow, London, England, assignor to
The British Drug Houses Limited
No Drawing. Filed Sept. 24, 1962, Ser. No. 225,966
Claims priority, application Great Britain Sept. 27, 1961
9 Claims. (Cl. 260—239.55)

This invention relates to a method for the preparation of 6-methyl-3-oxo-Δ$^{4,6}$-steroids.

It is an object of the present invention to provide a new route to 6-methyl-3-oxo-Δ$^{4,6}$-steroids employing as starting materials 6-methylene-3-oxo-Δ$^4$-steroids.

6-methyl-3-oxo-4,6-dienic steroids are known to those skilled in the art as valuable compounds possessing biological activity. Thus, for example, 17α-ethynyl-17β-hydroxy-6-methylandrosta-4,6-dien-3-one is an orally-active progestational agent. 6-methyl-6-dehydroprogesterone has progestational and claudogenic activity. 17α-acetoxy-6-methylpregna-4,6-diene - 3,20 - dione and 17α-acetoxy-6-methyl-16-methylenepregna - 4,6 - diene-3,20-dione (see British specification No. 870,286 and Belgian Patent No. 594,445) and 17α-acetoxy-6,16α-dimethylpregna-4,6-diene-3,20-dione (see British specification No. 884,544) are highly potent progestational agents and ovulation inhibitors. 6-methyl-6-dehydrotestosterone has androgenic properties. 6-methyl-6-dehydro cortisone acetate has glucocorticoid properties.

According to the present invention there is provided a process for the preparation of 6-methyl-3-oxo-Δ$^{4,6}$-steroids having, apart from substituents and unsaturated linkages in rings A, B, C and D, the general Formula I

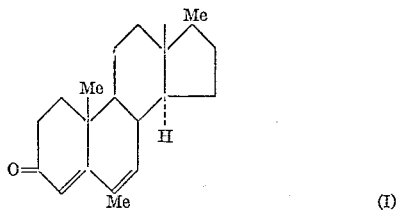

(I)

which process comprises contacting a 6-methylene-3-oxo-Δ$^4$-steroid having, apart from substituents and unsaturated linkages in rings A, B, C and D, the general Formula II

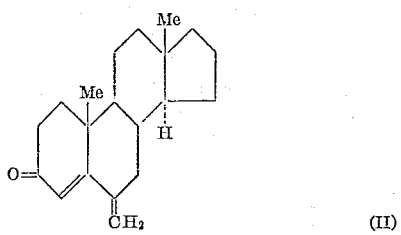

(II)

in a solvent with an activated metallic catalyst selected from the group consisting of palladium, platinum, rhodium, ruthenium, osmium, iridium and nickel.

Palladium is the preferred catalytic metal.

Palladium-charcoal is the preferred form of catalyst, but other forms such as palladium black, palladium/calcium carbonate, palladium/barium carbonate and palladium/barium sulphate may also be employed.

Catalytic forms of platinum, rhodium, ruthenium, osmium and iridium such as the forms in which the metal is dispersed onto charcoal, or Raney nickel, may likewise be used but, in general, are less suitable than the corresponding forms of palladium.

In the preferred embodiment of the invention activation of the preferred catalyst, palladium charcoal, is achieved using ethanol, which also functions as solvent.

The isomerisation proceeds best under neutral or slightly basic conditions. As the preferred catalyst (palladium charcoal) is often slightly acidic, it is preferred to add a small quantity of a weakly basic buffering salt to the isomerisation mixture. Sodium acetate is entirely satisfactory for this purpose, but other buffering salts may equally well be employed.

The reaction is conveniently performed by heating the 6-methylene steroid (II) with approximately 20% by weight of 5% palladium charcoal in industrial spirit under reflux when isomerisation to the 6-methyl steroid (I) occurs generally in from 12 to 60 hours. The quantity of catalyst employed is not critical as satisfactory conversion of (II) to (I) may be achieved using, for example, from 2% to 200% of palladium-charcoal allowing an appropriate length of time for the reaction to proceed to completion. The progress of the isomerisation may readily be followed by removing samples of the reaction mixture at regular intervals, filtering, and examining the filtrates by physical methods such as U.V. absorption or [α]$_D$. The ultraviolet absorption spectrum furnishes a particularly convenient parameter for this purpose as the maximum shifts from about 260 mμ (for a 6-methylene-3-oxo-Δ$^4$-steroid) to about 288–289 mμ (for a 6-methyl-3-oxo-4,6-dienic steroid).

Alternatively the ethanol may be replaced by a lower primary or secondary aliphatic alcohol and in particular by methanol, n- or i-propanol, n- or i-butanol, ethylene glycol or its monoalkyl ethers, which may likewise be used to both activate the catalyst and function as solvent.

In another embodiment of the invention the catalyst is activated by contact in a solvent with hydrogen or with an equivalent thereof. Elemental hydrogen is inconvenient on the industrial scale owing to its tendency to produce catalytic hydrogenation of both compounds (II) and (I), if present in excess of the amount required to activate the catalyst. Equivalents of hydrogen, i.e. organic substances which readily dehydrogenate in the presence of the catalyst, are preferred. Thus, for example, such organic substances as benzyl alcohol, cyclohexene, cyclohexadiene, phellandrene, 4-phenyl-3,5-dicarbethoxy-2,6-dimethyl-1,4-dihydropyridine and many other organic compounds as will be apparent to those skilled in the art, may be used to activate the catalyst. Thus, for example, conversion of (II) into (I) occurs following such procedures as:

Heating (II) with Pd—C in t-butanol under reflux in the presence of a small quantity of cyclohexene; heating (II) with Pd—C in tetrahydrofuran or dioxan in the presence of a small quantity of cyclohexene; heating (II) with Pd—C in acetic acid in the presence of a small quantity of benzyl alcohol, or with slow or dropwise addition of benzyl alcohol; pretreating the Pd—C catalyst with hydrogen gas, in ethanol or another lower aliphatic alcohol, then adding (II) and heating the mixture under reflux.

When performing the preferred embodiment of the invention (Pd—C in ethanol), the isomerisation reaction may be accelerated, if so desired, by adding to the reaction mixture such catalyst activators as cyclohexene and benzyl alcohol. Benzyl alcohol and cyclohexene are the preferred accelerators.

Thus in yet another embodiment of the invention a dilute solution of cyclohexene (for example, 1% solution of cyclohexene in ethanol) is added portionwise or continuously to the isomerisation mixture comprising the 6-methylenic steroid (II) in, for example, ethanol under reflux, until isomerisation to (I) is complete. By using such conditions the quantity of catalyst employed may be reduced to 1 to 2% and the time of isomerisation reduced to 1 to 4 hours.

The 6-methylene-3-oxo-$\Delta^4$-steroids (II) which form the starting materials of the present invention are described in our copending U.S. appln. Ser. Nos. 150,177, filed on November 6, 1961, and 176,423, filed on February 28, 1962. Such 6-methylene-3-oxo-$\Delta^4$-steroidal starting materials include compounds of the androstane, 19-norandrostane, 9$\beta$,10$\alpha$-androstane and pregnane, 19-norpregnane and 9$\beta$,10$\alpha$-pregnane series which may additionally contain further substituents as indicated below:

*Hydroxyl groups.*—Hydroxyl groups and functional derivatives thereof in positions 11, 12, 15, 16 (including 16-hydroxy methyl), 17, 18, 20 and 21 (including the condensation products of 16$\alpha$,17$\alpha$-glycols with carbonyl components).

*Carbonyl groups.*—Carbonyl groups at positions 11, 12, 16, 17, 18 and 20.

*Carbalkoxy groups.*—Carbalkoxy groups at $C_{13}$, $C_{16}$ and $C_{17}$, or in a sidechain at $C_{17}$.

*Alkyl groups.*—Alkyl groups other than at $C_4$ and $C_6$ and in particular methyl groups at $C_2$, $C_{11}$, $C_{16}$, $C_{17}$ and $C_{21}$ and ethyl at $C_{17}$.

*Alkenyl groups.*—Vinyl and allyl groups at $C_{17}$.

*Methylene and ethylidene groups.*—Such groups at positions 11, 16 and 17 and including the 16$\alpha$,17$\alpha$-cyclomethylene group.

*Lactone, ether and spiroketal residues.*—Spirolactone residues such as —O.CO.CH$_2$.CH$_2$— attached to $C_{17}$, etheric groups at $C_{16}$, and bridging $C_{18}$ and $C_{20}$, spiroketal moieties such as are present in diosgenone, ketalised carbonyl groups.

*Halogen groups.*—Fluorine substituents in rings C and D or in the sidechain.

*Unsaturated linkages.*—Unsaturated linkages at $C_{9(11)}$, $C_{11}$, $C_{14}$, $C_{16}$ and $C_{17(20)}$.

*Ketol groups.*—Ketol groups at $C_{16}$–$C_{17}$, $C_{17}$–$C_{20}$ and $C_{20-21}$ are preferably acylated prior to reaction.

*Corticoid sidechain.*—The corticoid sidechain may be protected by acylation at $C_{21}$, and at $C_{21}$ and $C_{17}$, by reaction with formaldehyde to give the bismethylenedioxy derivative, by forming the $C_{17}$–$C_{21}$ cyclic carbonate or acetonide or by other methods known to those skilled in the art, and subsequently regenerated as desired.

*Epoxides.*—In particular 16$\alpha$,17$\alpha$- and 9$\beta$,11$\beta$-epoxides.

In particular, the process of the invention may be applied to the 6-methylenic derivatives of the following steroids and acyl derivatives thereof:

Testosterone
2-methyltestosterone
17$\alpha$-methyltestosterone
9(11)-dehydro-17$\alpha$-methyltestosterone
17$\alpha$-hydroxyprogesterone
9(11)-dehydro-17$\alpha$-acyloxyprogesterone
16-methyl-17$\alpha$-acyloxyprogesterone
9(11)-dehydro-16-methyl-17$\alpha$-acyloxyprogesterone
16-methylene-17$\alpha$-acyloxyprogesterone
9(11)-dehydro-16-methylene-17$\alpha$-acyloxyprogesterone
17$\alpha$-hydroxy-16-ethylideneprogesterone
16$\alpha$,17$\alpha$-dimethylmethylenedioxyprogesterone
9(11)-dehydro-16$\alpha$,17$\alpha$-dimethylmethylenedioxyprogesterone
Cortisone
16-methylcortisone
21-methylcortisone
16-methylenecortisone
16$\alpha$-hydroxy cortisone and the (16$\alpha$,17$\alpha$)-acetonide thereof
Hydrocortisone
16-methylhydrocortisone
21-methylenehydrocortisone
16-methylenehydrocortisone
16$\alpha$-hydroxyhydrocortisone and the (16$\alpha$,17$\alpha$)-acetonide thereof
17$\alpha$,21-dihydroxypregna-4,9(11)-diene-3,20-dione
16-methyl-17$\alpha$,21-dihydroxypregn-4,9(11)-diene-3,20-dione
21-methyl-17$\alpha$,21-dihydroxypregna-4,9(11)-diene-3,20-dione
16-methylene-17$\alpha$,21-dihydroxypregna-4,9(11)-diene-3,20-dione
16$\alpha$-hydroxy-17$\alpha$,21-dihydroxypregna-4,9(11)-diene-3,20-dione and the (16,17) acetonide thereof
21-fluoro-17$\alpha$-hydroxypregna-4,9(11)-diene-3,20-dione and the (16,17) acetonide thereof
21-fluoro-17$\alpha$-hydroxypregn-4-ene-3,11,20-trione and the (16,17) acetonide thereof
21-fluoro-11,17$\alpha$-dihydroxypregn-4-ene-3,20-dione and the (16,17) acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4,17-dienoic acid (esters)
3,11-dioxopregna-4,17-dien-21-oic acid (esters)
11-hydroxy-3-oxopregna-4,17-dien-21-oic acid (esters)
9(11)-dehydro-3-oxopregna-4,17-dien-21-oic acid (esters)
21-fluoro-17$\alpha$-hydroxyprogesterone
Progesterone
16-methylprogesterone
11$\alpha$-hydroxyprogesterone
11-oxoprogesterone
9(11)-dehydroprogesterone
21-methylprogesterone
Diosgenone
16-methyl-16,17-dehydroprogesterone
16-carbalkoxyprogesterone
16-hydroxymethylprogesterone
3-(3-oxo-17$\beta$-hydroxyandrost-4-ene-17$\alpha$-yl)propionic acid and lactone
21-fluoroprogesterone
Testololactone
The 9$\alpha$-fluoro-derivatives of those corticoids mentioned above
16$\alpha$,17$\alpha$-cyclomethyleneprogesterone Following is a description by way of example of methods for carrying the invention into effect.

*Example 1*

17$\alpha$-acetoxy-6-methyleneprogesterone (20 g.), sodium acetate (10 g.), 5% palladium charcoal (5 g.) and ethanol (200 ml.) were stirred and heated under reflux for 20 hours. A sample of the solution (0.5 ml.) was withdrawn and filtered. The filtrate showed an ultraviolet absorption maximum at 288.5 m$\mu$, indicating completion of the reaction. The hot solution was filtered and the catalyst washed on the filter with hot ethanol (50 ml.). The filtrate was diluted with hot water (100 ml.) and allowed to cool. The crystalline product, purified from methanol, gave 17$\alpha$-acetoxy-6-methylpregna-4,6-diene-3,20-dione, needles, M.P. 218 to 220° C., $[\alpha]_D^{23}$+5° (c, 0.85 in CHCl$_3$), $\lambda_{max}$. 288 m$\mu$ ($\epsilon$ 25,800) in ethanol.

*Example 2*

5% palladium-charcoal (100 mg.) was stirred and heated under reflux in ethanol (20 ml.) containing cyclohexene (0.2 ml.) for 2 hours. 17$\alpha$-acetoxy-6-methyleneprogesterone (1 g.) and sodium acetate (1 g.) were then added and stirring and heating were continued until a filtered sample of the solution exhibited an ultraviolet absorption maximum at 288.5 m$\mu$ (5 hours). The product, isolated as in Example 1 was 17$\alpha$-acetoxy-6-methylpregna-4,6-diene-3,20-dione, M.P. 218 to 220° C.

Example 3

5% palladium-charcoal (100 mg.) in ethanol (20 ml.) containing sodium acetate (0.5 g.) was stirred in hydrogen until absorption ceased (15 minutes ca. 10 ml. absorbed). The hydrogen atmosphere was replaced by air, and the mixture was stirred and heated under reflux for 5 minutes then 17α-acetoxy-6-methyleneprogesterone (1 g.) was added. After stirring and heating for a further 6 hours the product was isolated as in Example 1, giving 17α-acetoxy-6-methylpregna-4,6-diene-3,20-dione, M.P. 218 to 220° C.

Example 4

17α-acetoxy-6-methylene progesterone (5 g.), 5% palladium-charcoal (100 mg.), sodium acetate (5 g.) and ethanol (100 ml.) were heated under reflux and stirred while a 1% solution of cyclohexene in ethanol was added continuously at a uniform rate of 6 ml. per hour. After 1.5 hours a sample showed maximum ultraviolet absorption at 288.5 m$\mu$, and the product was immediately isolated by the process of Example 1, giving 17α-acetoxy-6-methylpregna-4,6-diene-3,20-dione, M.P. 218 to 220° C.

Example 5

5% palladium-charcoal (100 mg.) was stirred and heated under reflux in ethanol (20 ml.) containing cyclohexene (0.2 ml.) for 2 hours. 6-methylene-25D-spirost-4-en-3-one (1 g.) and sodium acetate were then added, and stirring and heating were continued for 5 hours. The hot solution was filtered and the catalyst washed on the filter with hot ethanol (50 ml.). The filtrate was diluted with water (150 ml.) and the product isolated with ether. Crystallisation from acetone-hexane gave 6-methyl-25D-spirosta-4,6-dien-3-one in prisms, M.P. 215 to 217° C. not depressed in admixture with an authentic specimen.

Example 6

6-methylenepregn-4-en-3,20-dione (5 g.), 5% palladium charcoal (100 mg.), sodium acetate (5 g.) and ethanol (100 ml.) were heated under reflux and stirred while a 1% solution of cyclohexene in ethanol was added continuously at a uniform rate of 6 ml. per hour. After 1½ hours, the solution was filtered and the product isolated with ether. Crystallisation from hexane gave 6-methylpregna-4,6-diene-3,20-dione, plates, M.P. 152–154° C., [α]$_D^{20}$ +69° (c. 1.01 in chloroform)

Example 7

5% palladium-charcoal (200 mg.) in ethanol (50 ml.) containing sodium acetate (1 g.) was stirred in hydrogen until absorption ceased. The hydrogen atmosphere was replaced by air, and the mixture was stirred and heated under reflux for 5 minutes. 17β-acetoxy-6-methyleneandrost-4-en-3-one (2 g.) was added, and after stirring and heating for a further 6 hours, the product was isolated with ether following removal of the catalyst. Purification from acetone-hexane gave 17β-acetoxy-6-methylandrosta-4,6-dien-3-one, plates, M.P. 174° C., not depressed in admixture with an authentic specimen.

Example 8

17α,20:20,21-bismethylenedioxy - 6 - methylenepregn-4-ene-3,11-dione (2 g.), sodium acetate (1 g.), 5% palladium-charcoal (0.5 g.) and ethanol (20 ml.) were stirred and heated under reflux for 20 hours. The product, isolated as described in Example 1, was crystallised to give 17α,20:20,21-bismethylenedioxy-6-methylpregna-4,6-diene-3,11-idone with $\lambda_{max.}$ 291 m$\mu$ (log $\epsilon$ 4.36).

Example 9

6-methylene cortisone acetate (4 g.), sodium acetate (2 g.), 5% palladium-charcoal (1 g.) and ethanol (40 ml.) were stirred and heated under reflux for 18 hours. The product isolated as described in Example 1, was crystallised to give 6-dehydro-6-methyl cortisone acetate, M.P. 248 to 252° C., $\lambda_{max.}$ 291 m$\mu$ (log $\epsilon$ 4.37).

Example 10

16α,17α-isopropylidenedioxy - 6-methylenepregn-4-ene-3,20-dione (1 g.) in ethanol (20 ml.) was treated with 5% palladium-charcoal (50 mg.) and sodium acetate (1 g.). The mixture was stirred and heated under reflux while a 1% solution of cyclohexene in ethanol was added continuously at the rate of 6 ml. per hour. After 2 hours, the mixture was filtered and the filtrate concentrated under reduced pressure. Addition of water gave 16α, 17α-isopropylidenedioxy-6-methylpregna - 4,6 - diene-3,20-dione, which was crystallised from aqueous ethanol. It formed needles, M.P. 206 to 208° C., not depressed in admixture with an authentic specimen.

Example 11

17β-acetoxy-2α-methyl - 6 - methyleneandrost - 4-en-3-one (1 g.) in ethanol (20 ml.) was treated with 5% palladium-charcoal (50 mg.) and sodium acetate (1 g.). The mixture was stirred and heated under reflux while a 1% solution of cyclohexene in ethanol was added continuously at the rate of 6 ml. per hour. After two hours, the product was isolated as described in Example 1, and purified by crystallisation. 17β-acetoxy-2α,6-dimethylandrosta-4,6-dien-3-one had $\lambda_{max.}$ 289 m$\mu$ (log $\epsilon$ 4.37).

Example 12

17α-acetoxy-6,16-bismethylenepregn - 4 - ene-3,20-dione (2 g.), sodium acetate (1 g.), 5% palladium-charcoal (0.5 g.) and ethanol (20 ml.) were stirred and heated under reflux for 20 hours. The product, isolated as described in Example 1, was crystallised to give 17α-acetoxy-6-methyl-16-methylenepregna-4,6-diene-3,20-dione, M.P. 223 to 225° C., identical in every respect with an authentic specimen.

Example 13

16-methyl-6-methylene-16-dehydroprogesterone (1 g.), sodium acetate (0.5 g.), 5% palladium-charcoal (0.25 g.) and ethanol (10 ml.) were stirred and heated under reflux for 16 hours. The product, isolated as described in Example 1, was crystallised to give 6,16-dimethylpregna-4,6,16-triene-3,20-dione, having $\lambda_{max.}$ 251 m$\mu$ (log $\epsilon$ 3.94) and 290 m$\mu$ (log $\epsilon$ 4.37).

Example 14

17α-acetoxy-16-ethylidene-6-methyleneprogesterone (2 g.), sodium acetate (1 g.), 5% palladium-charcoal (0.5 g.) and ethanol (20 ml.) were stirred and heated under reflux for 20 hours. The product, isolated as described in Example 1, was crystallised to give 17α-acetoxy-16-ethylidene - 6-methylpregna-4,6-diene-3,20-dione having $\lambda_{max.}$ 290 m$\mu$ (log $\epsilon$ 4.36).

Example 15

6 - methylene - 17β - propionoxy-17α-(prop-1'-ynyl) androst-4-en-3-one (0.5 g.), 5% palladium-charcoal (10 mg.), sodium acetate (0.5 g.) and ethanol (20 ml.) were heated under reflux and stirred while a 1% solution of cyclohexene in ethanol was added continuously at a uniform rate of 6 ml. per hour. After 1 hour, the product was isolated and purified to give 6-methyl-17β-propionoxy - 17α-(prop-1'-ynyl)-androsta-4,6-dien-3-one having $\lambda_{max.}$ 290 m$\mu$ (log $\epsilon$ 4.35).

Example 16

6 - methyleneandrost - 4-ene-3,17-dione (1 g.), 5% palladium-charcoal (0.5 g.), sodium acetate (0.5 g.) and ethanol (10 ml.) were stirred and heated under reflux for 28 hours. The catalyst was removed by filtration, and the filtrate diluted with water and extracted with ether. The ether was washed, dried and evaporated, and the product was purified from acetone-hexane to give 6-methylandrosta-4,6-diene-3,17-dione, needles M.P. 163 to 164° C., [α]$_D^{25}$ +106° (c. 0.66 in CHCl$_3$), $\lambda_{max.}$ 287 m$\mu$ ($\epsilon$=22,300) in ethanol.

Example 17

17α-acetoxy-6-methyleneprogesterone (200 mg.), 5% platinum-charcoal (200 mg.), sodium acetate (200 mg.) and ethanol (20 ml.) were heated and stirred under reflux for 24 hours. The catalyst was removed by filtration, and the product precipitated by the addition of water. Purification by chromatography on alumina (5 g.) gave 17α - acetoxy-6-methylpregna-4,6-diene-3,20-dione, M.P. 218 to 220° C.

Example 18

17α-acetoxy-6-methyleneprogesterone (200 mg.), 5% rhodium-charcoal (200 mg.), sodium acetate (200 mg.) and ethanol (20 ml.) were heated and stirred under reflux for 96 hours. Chromatography of the product afforded 17α - acetoxy-6-methylpregna-4,6-diene-3,20-dione, $\lambda_{max.}$ 288 m$\mu$.

Example 19

21 - acetoxy-17α-hydroxy-6-methylenepregna-4,9(11)-diene-3,20-dione (2.5 g.), 5% palladium-charcoal (50 mg.), sodium acetate (2.5 g.) and ethanol (50 ml.) were heated under reflux and stirred while a 1% solution of cyclohexene in ethanol was added continuously at a uniform rate of 6 ml. per hour. After 1½ hours, the product was isolated and crystallised. 21-acetoxy-17α-hydroxy - 6-methylpregna-4,6,9(11)-triene-3,20-dione with $\lambda_{max.}$ 288 m$\mu$ (log $\epsilon$ 4.37) was obtained.

Example 20

17β - acetoxy - 17α-methyl-6-methyleneandrost-4-en-3-one (1 g.), sodium acetate (0.5 g.), 5% palladium-charcoal (0.25 g.) and ethanol (15 ml.) were stirred and heated under reflux for 23 hours. The product was isolated as described in Example 1 and purified by crystallisation to give 17β-acetoxy-6,17α-dimethylandrosta-4,6-dien-3-one with $\lambda_{max.}$ 290 m$\mu$ (log $\epsilon$ 4.37).

Example 21

6 - methylene-17β-propionoxy-17α-vinylandrost-4-en-3-one (1 g.), 5% palladium-charcoal (20 mg.), sodium acetate (1 g.) and ethanol (20 ml.) were heated under reflux and stirred while a 1% solution of cyclohexene in ethanol was added continuously at a rate of 6 ml. per hour. After 1½ hours, the product was isolated and purified to give 6-methyl-17β-propionoxy-17α-vinylandrosta-4,6-dien-3-one having $\lambda_{max.}$ 290 m$\mu$ (log $\epsilon$ 4.37).

Example 22

20β - acetoxy - 6-methylenepregn-4-en-3-one (2 g.), sodium acetate (1 g.), 5% palladium-charcoal (0.5 g.) and ethanol (20 ml.) were stirred and heated under reflux for 18 hours. The product was isolated as described in Example 1, and crystallised. 20β-acetoxy-6-methylpregna-4,6-dien-3-one with $\lambda_{max.}$ 290 m$\mu$ (log $\epsilon$ 4.36) was obtained.

Example 23

17α,20:20,21 - bismethylenedioxy - 11β - hydroxy-6-methylenepregn-4-en-3-one (1 g.) was processed exactly as described in Example 22. The product was isolated and purified by crystallisation to give 17α,20:20,21-bismethylenedioxy - 11β-hydroxy-6-methylpregna-4,6-dien-3-one, having $\lambda_{max.}$ 290 m$\mu$ (log $\epsilon$ 4.36).

Example 24

17α - acetoxy - 16α-methyl-6-methylenepregn-4-ene-3,20-dione (1 g.) was processed exactly as described in Example 22. The product was isolated and crystallised from aqueous methanol, giving 17α-acetoxy-6,16α-dimethylpregna-4,6-diene-3,20-dione, prisms, M.P. 202° to 204° C., $\lambda_{max.}$ 286 m$\mu$ (log $\epsilon$ 4.35).

Example 25

Treatment of 21-acetoxy-6-methylenepregn-4-ene-3,20-dione by the process of Example 1 afforded 21-acetoxy-6-methylpregna-4,6-diene-3,20-dione having $\lambda_{max.}$ 289 m$\mu$ (log $\epsilon$ 4.36).

Example 26

Treatment of 6-methylene cortisone 17,21-diacetate by the process of Example 1 gave 17α,21-diacetoxy-6- methylpregna-4,6-diene-3,11,20-trione having $\lambda_{max.}$ 291 m$\mu$ (log $\epsilon$ 4.37).

Example 27

Treatment of 17β-hydroxy-17α-methyl-6-methyleneandrost-4-en-3-one by the process of Example 1 gave 6,17α-dimethyl-17β-hydroxyandrosta-4,6-dien-3-one, M.P. 157 to 158° C., $\lambda_{max.}$ 290 m$\mu$ (log $\epsilon$ 4.37).

Example 28

Treatment of 17α-acetoxy-21-fluoro-6-methylenepregn-4-ene-3,20-dione by the process of Example 1 gave 17α-acetoxy - 21- fluoro - 6 - methylpregna - 4,6 - diene - 3,20-dione having $\lambda_{max.}$ 290 m$\mu$ (log $\epsilon$ 4.36).

Example 29

The starting material employed in Example 29 was prepared as follows:

16α,17α - cyclomethylene - 6 - formyl - 3 - methoxypregna-3,5-dien-20-one (British patent application No. 38,236/60) (2 g.) in a mixture of methanol (40 ml.) and tetrahydrofuran (50 ml.) was treated with sodium borohydride (1 g.), added in small portions over a period of 10 minutes. The mixture was set aside for 60 hours at room temperature, then poured into water and the product isolated with ether. Crystallisation from acetone-hexane gave material with M.P. 114° C. A solution of this material (1.5 g.) in acetic acid (10 ml.) was heated for 10 minutes at 80° C., poured into water, and the product isolated with ether. Its solution in pyridine (15 ml.) was added to chromium trioxide (1.5 g.) in pyridine (15 ml.) and the mixture set aside overnight at room temperature. Ether (200 ml.) was added, and the mixture washed with dilute hydrochloric acid, then with aqueuos sodium hydrogen carbonate, water, and then dried over calcium chloride. The residue obtained on removal of the ether was purified from acetone-hexane to give 16α,17α-cyclomethylene-6-methylenepregn-4-ene-3,20-dione, prisms, M.P. 168 to 169° C., $[\alpha]_D^{22}$ +362° (c., 0.83 in chloroform, $\lambda_{max.}$ 260 m$\mu$ ($\epsilon$=11,200).

Treatment of 16α,17α-cyclomethylene-6-methylenepregn-4-ene-3,20-dione by the process of Example 22 gave 16α,17α - cyclomethylene - 6 - methylenepregna - 4,6 - diene-3,20-dione, needles (from aqueous methanol), M.P. 138 to 140° C., $[\alpha]_D^{22}$ +177° (c., 1.1 in chloroform), $\lambda_{max.}$ 289.5 m$\mu$ (log $\epsilon$ 4.38).

I claim:

1. A process for the preparation of a 6-methyl-3-oxo-$\Delta^{4,6}$-steroid of the androstane, 19-norandrostane, pregnane, and 19-norpregnane series, which comprises contaacting a corresponding 6-methylene-3-oxo-$\Delta^4$ steroid of said series in a solvent in the presence of a weakly basic buffering salt with an activated metallic catalyst selected from the group consisting of palladium, platinum, rhodium, ruthenium, osmium, iridium and nickel.

2. A process as claimed in claim 1 wherein palladium is the catalytic metal employed in the form of palladium-charcoal.

3. A process as claimed in claim 2 wherein a lower aliphatic alcohol is employed as activator and solvent for the palladium-charcoal.

4. A process as claimed in claim 3 wherein the lower aliphatic alcohol is ethanol.

5. A process as claimed in claim 1 wherein the weakly basic buffering salt is sodium acetate.

6. A process as claimed in claim 1 wherein the 6-methylene steroid is heated with approximately 20% by weight of 5% palladium-charcoal in ethanol under reflux for from 12 to 60 hours.

7. A process as claimed in claim 1 wherein the metallic catalyst is activated by contact in a solvent with hydrogen.

8. A process as claimed in claim 7 wherein the metallic catalyst is activated by contact in a solvent with a small quantity of cyclohexene.

9. A process as claimed in claim 8 wherein a 1% solution of cyclohexene in ethanol is added continuously to the reaction mixture comprising the 6-methylene steroid in ethanol under reflux until isomerisation is complete.

No references cited.